US008375923B2

(12) United States Patent
Pursifull

(10) Patent No.: US 8,375,923 B2
(45) Date of Patent: Feb. 19, 2013

(54) FUEL INJECTOR INTERFACE AND DIAGNOSTICS

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/449,209

(22) Filed: Apr. 17, 2012

(65) Prior Publication Data

US 2012/0203442 A1 Aug. 9, 2012

Related U.S. Application Data

(63) Continuation of application No. 12/622,838, filed on Nov. 20, 2009, now Pat. No. 8,161,946.

(51) Int. Cl.
*F02M 51/00* (2006.01)
*G06F 19/00* (2006.01)

(52) U.S. Cl. ......................... 123/479; 701/114; 701/115

(58) Field of Classification Search .................. 123/478, 123/479, 490; 701/104, 107, 114, 115; 702/182, 702/183, 185; 73/114.47–114.49; 361/152, 361/154
See application file for complete search history.

(56) References Cited

U.S. PATENT DOCUMENTS 3,948,228 A * 4/1976 Luchaco ....................... 123/688
4,379,332 A * 4/1983 Busser et al. ................. 701/105
4,402,294 A * 9/1983 McHugh et al. .............. 123/480
4,972,293 A 11/1990 Verner
5,307,290 A 4/1994 Raviglione et al.
5,445,019 A 8/1995 Glidewell et al.
5,469,825 A 11/1995 Golab et al.
5,550,762 A * 8/1996 Doll .............................. 702/183
5,809,446 A * 9/1998 Visser ........................... 701/103
5,839,420 A * 11/1998 Thomas ........................ 123/478
5,920,004 A 7/1999 Gottshall et al.
6,133,653 A * 10/2000 Gaskins ........................ 307/125
RE37,807 E * 7/2002 Shinogle et al. .............. 123/480
6,418,913 B1 * 7/2002 Schmidt et al. ............... 123/480
6,601,567 B2 * 8/2003 Marceca et al. .............. 123/490
6,651,629 B2 * 11/2003 McCoy et al. ................ 123/480
6,694,242 B2 2/2004 Wong
6,836,721 B2 12/2004 Stevens
6,865,473 B2 3/2005 Moessinger et al.
6,973,920 B2 * 12/2005 Buck et al. .................... 123/480
7,000,599 B2 2/2006 Kirkpatrick
7,003,393 B2 2/2006 Stevens
7,124,741 B2 * 10/2006 Cagnoni et al. ............... 123/472
7,195,001 B1 3/2007 Pallett
7,497,204 B2 3/2009 Perryman et al.
7,624,721 B2 12/2009 Perryman et al.
7,637,253 B2 * 12/2009 Remele et al. ................ 123/480
7,640,918 B2 * 1/2010 Perryman et al. ............. 123/479
7,681,555 B2 * 3/2010 Hargreaves et al. .......... 123/490
7,930,089 B2 * 4/2011 Askew .......................... 701/104
(Continued)

FOREIGN PATENT DOCUMENTS

EP 1400678 A2 3/2004
JP 2007205218 A 8/2007

*Primary Examiner* — Thomas Moulis

(74) *Attorney, Agent, or Firm* — Julia Voutyras; Alleman Hall McCoy Russell & Tuttle LLP

(57) ABSTRACT

A method comprising receiving a fuel injection signal from a first driver circuit via a control line, feeding the fuel injection signal to a second fuel injector driver circuit, sending a control signal output from the second fuel injector driver circuit to a fuel injector, monitoring the fuel injector for degradation based on operation according to the control signal, and in response to degradation of the fuel injector, changing a state of the control line.

21 Claims, 6 Drawing Sheets

U.S. PATENT DOCUMENTS

| | | | | |
|---|---|---|---|---|
| 8,051,704 | B2 | 11/2011 | Kim et al. | |
| 8,096,285 | B2 * | 1/2012 | Rottenwohrer et al. | 123/478 |
| 2004/0065747 | A1 * | 4/2004 | Petrone et al. | 239/5 |
| 2005/0273246 | A1 * | 12/2005 | Griese | 701/113 |
| 2007/0227506 | A1 | 10/2007 | Perryman et al. | |
| 2008/0269980 | A1 | 10/2008 | Spivak | |

* cited by examiner

FUEL INJECTOR INTERFACE AND DIAGNOSTICS

CROSS REFERENCE TO RELATED APPLICATIONS

The present application is a continuation of U.S. patent application Ser. No. 12/622,838 filed Nov. 20, 2009, the entire contents of which are incorporated herein by reference for all purposes.

BACKGROUND AND SUMMARY

Engine configurations that allow for more than one type of fuel or a blend of different types of fuel to be used during combustion, commonly referred to as flex-fuel or multi-fuel engine configurations, may provide flexibility in fueling and/or may provide more efficient engine operation.

Some multi-fuel engine configurations may include more than one type of fuel injector. For example, a multi-fuel engine may include a high impedance fuel injector (e.g., a saturated fuel injector) and a low impedance fuel injector (e.g., peak and hold fuel injector). The high impedance fuel injector has a slower operational response time relative to the low impedance fuel injector, and thus may be positioned to provide port fuel injection since fuel injection timing tolerances may be greater. Correspondingly, the low impedance fuel injector may be positioned to provide either port fuel injection or direct fuel injection since fuel injection timing tolerances may be smaller. Although the low impedance fuel injector is more responsive, it has a higher production cost. Accordingly, in order to allow for injection of different types of fuel and/or injection of fuel at different locations while reducing engine production costs, both high impedance and low impedance fuel injectors may be implemented in a multi-fuel engine configuration.

To further reduce engine production costs, a powertrain control module (PCM) that includes a voltage-controlled fuel injector driver (i.e., saturating driver) circuit may be implemented in a multi-fuel engine configuration to control fuel injection. The voltage-controlled fuel injector driver circuit is less complex, relative to a current-controlled fuel injector driver circuit (i.e., peak and hold), and thus may be produced at a lower cost. This cost reduction is compounded by the large production volumes of this type of PCM, due to its compatibility with less expensive high impedance fuel injectors, allowing for an even greater reduction in cost.

However, the voltage-controlled fuel injector driver circuit is not compatible with the low impedance fuel injector. If the low impedance fuel injector were directly connected to the voltage-controlled driver circuit, the voltage-controlled driver circuit would over-current the low-impedance fuel injector, which would damage the low impedance fuel injector and voltage-controlled fuel injector driver circuit.

Various external driver interface devices have therefore been developed to convert voltage-controlled signals into to current-controlled signals. For example, a current-controlled fuel injector driver circuit may be connected in between a voltage-controlled fuel injector driver circuit output line of the PCM and a low impedance fuel injector. Since the current-controlled fuel injector driver circuit is positioned between the PCM and the low impedance fuel injector, the capability of the PCM to perform diagnostic on the low impedance fuel injector is interrupted. This may cause some issues. For example, no diagnostic feedback for the low impedance fuel injector may be provided to the PCM. Thus, if the low impedance fuel injector were to become degraded improper engine operation may occur. As another example, diagnostic information for the low impedance fuel injector may be provided from the current-controlled driver-circuit to the PCM via a controller-area network (CAN). This may suffer the drawback of needing additional PCM I/O pins, control lines, and/or circuits to relay the low impedance fuel injector diagnostic data back to the PCM.

The inventors herein have realized that accurate control and diagnostic may be achieved for a low impedance fuel injector that interacts with a PCM that includes a voltage-controlled driver circuit by utilizing a method comprising, receiving a fuel injection signal from a first driver circuit via a control line, feeding the fuel injection signal to a second fuel injector driver circuit, sending a control signal output from the second fuel injector driver circuit to a fuel injector, monitoring the fuel injector for degradation based on operation according to the control signal, and in response to degradation of the fuel injector, changing a state of the control line.

By changing a state of the control line based on degradation of the fuel injector, the diagnostic data may be communicated back to the PCM. In this way, when a fuel injector is not directly connected to the PCM, fuel injector degradation data may be communicated to the PCM without use of additional I/O pins and/or communication lines.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
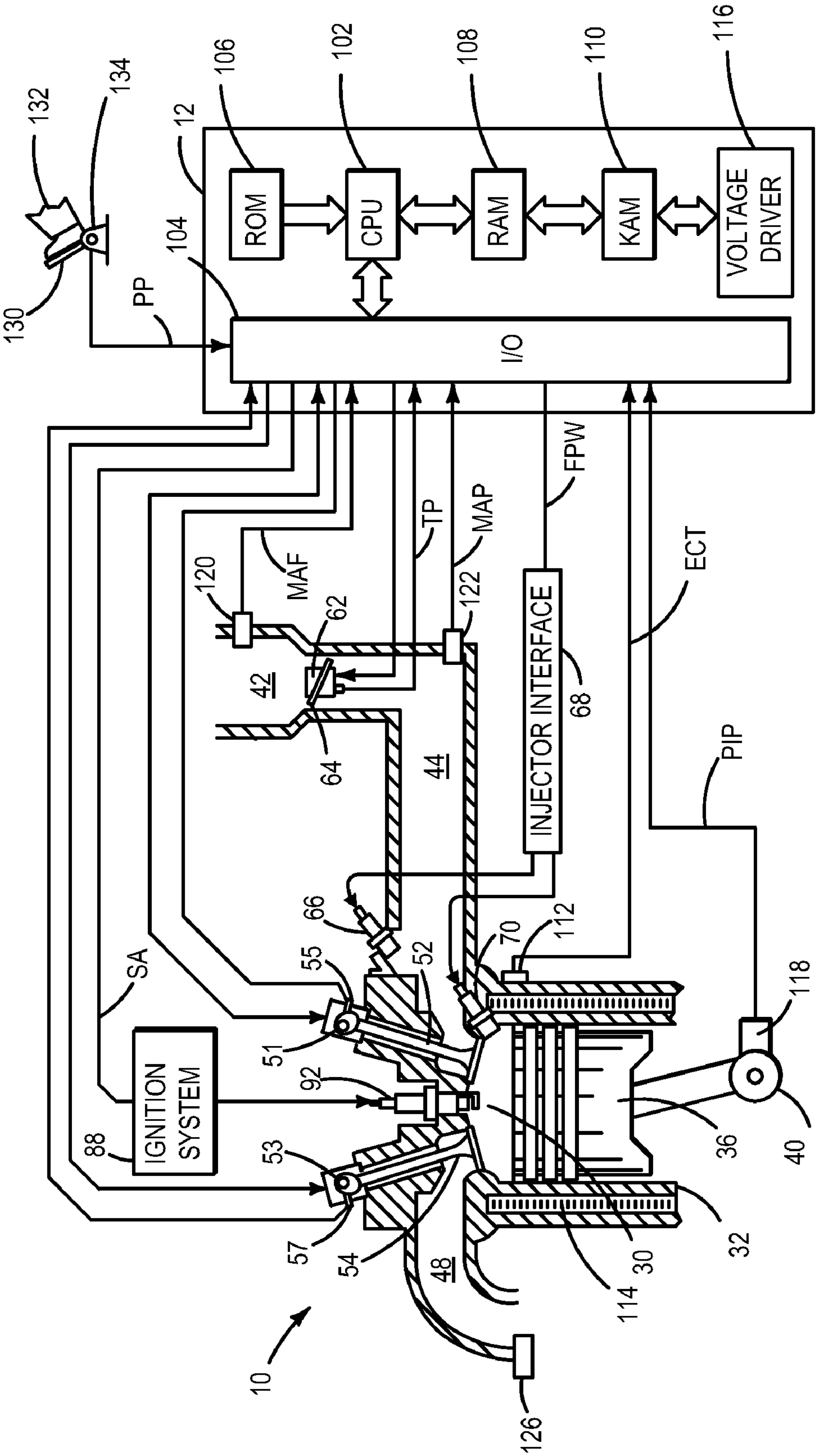
FIG. 1 is a schematic diagram of an embodiment of an engine system.

FIG. 1 is a schematic diagram showing one cylinder of multi-cylinder engine 10, which may be included in a propulsion system of an automobile. Engine 10 may be controlled at least partially by a control system including a controller or powertrain control module (PCM) 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by PCM 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

High impedance fuel injector 66 is shown arranged in intake manifold 44 in a configuration that provides what is known as port injection of fuel into the intake port upstream of combustion chamber 30. High impedance fuel injector 66 may have a resistance selected from a range between approximately 10 and 16 Ohms measured across the terminals of the fuel injector. High impedance fuel injector 66 may inject fuel in proportion to the pulse width of signal FPW received from logic components of PCM 12 via fuel injector interface device 68. Signal FPW may be provided to fuel injector interface device 68 from voltage-controlled fuel injector driver circuit 116. Voltage-controlled fuel injector driver circuit 116 may be integrated into PCM 12 so that high impedance fuel injector 66 directly connects with PCM 12.

In some embodiments, combustion chamber 30 may alternatively or additionally include a low impedance fuel injector 70 coupled directly to combustion chamber 30 for injecting fuel directly therein, in a manner known as direct injection. Low impedance fuel injector 70 may have a resistance selected from a range between approximately 1 and 5 Ohms measured across the terminals of the fuel injector. Low impedance fuel injector 70 may inject fuel in proportion to the pulse width of signal FPW received from logic components of PCM 12 via fuel injector interface device 68. Low impedance fuel injector 70 may include low resistance coils that draw a high amount of current, under some conditions. As discussed above, low impedance fuel injector 70 may not function properly under some conditions if directly connected to PCM 12, due to the high amperage drawn by the low impedance coils. Accordingly, fuel injector interface device 68 may convert the FPW signal to be compatible with low impedance fuel injector 70 so as to inhibit potential degradation of PCM 12 and/or low impedance fuel injector 70.

In some embodiments, the engine may include low impedance fuel injectors and may not include high impedance fuel injectors. In such embodiments, the low impedance fuel injectors may interface with a PCM including a voltage-controlled fuel injector driver circuit via a fuel injector interface device. This configuration may be implemented where the precision of low impedance fuel injectors are desired for direct injection while maintaining the reduction in cost afforded by a widely available PCM that includes a voltage-controlled fuel injector driver circuit. In some embodiments, the engine may include high impedance fuel injectors and low impedance fuel injectors for each cylinder. This configuration may be implemented to accommodate multi-fuel applications. For example, the high impedance fuel injectors may inject gasoline into the intake port of the cylinders to be used for combustion and the low impedance fuel injectors may directly inject ethanol into the cylinders to inhibit knock.

It will be appreciated that the low impedance fuel injectors may be positioned in any suitable configuration to provide direct fuel injection or port fuel injection, alone or in combination with the high impedance fuel injectors. Although only one cylinder of engine 10 is shown in the illustrated embodiment, one or more low impedance fuel injectors and/or high impedance fuel injectors may be positioned on some or all cylinders of engine 10. Fuel injection configurations and operations will be discussed in further detail below with reference to FIGS. 2-4.

Fuel may be delivered to high impedance fuel injector 66 and/or low impedance fuel injector 70 by a fuel system (not shown) including a fuel tank, a fuel pump, and a fuel rail. In some embodiments, different types of fuel may be delivered to different types of fuel injectors. In some embodiments, the same type of fuel may be delivered to different types of fuel injectors. In some embodiments, different types of fuel may be stored in different holding tanks. In some embodiments, different types of fuel or a fuel blend may be stored in the same tank and may be separated during delivery to different types of fuel injectors.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

PCM 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus, all of which may be referred to as logic components or control logic of PCM 12. PCM 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold.

Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

PCM 12 may include voltage-controlled fuel injector driver circuit 116 to receive signal FPW from logic components of PCM 12 based on engine operating parameters received from various engine sensors. Voltage-controlled fuel injector driver circuit 116 may be configured to adjust the voltage of signal FPW to operate a high impedance fuel injector. In some embodiments, PCM 12 may include a current-controlled fuel injector driver circuit that adjusts the current of signal FPW to operate a low impedance fuel injector in addition to or instead of a voltage-controlled fuel injector.

PCM 12 may include a limited number of input/output pins to send/receive signals to actuators and/or sensors. The I/O pin limitations on PCM 12 may make it desirable to combine or omit various signal lines in order to reduce the I/O pin requirement to control the engine. In particular, it may be desirable to combine fuel injector diagnostic feedback signals on the same I/O lines as fuel injector control signals. Accordingly, diagnostic I/O pin requirements may be reduced. Methods for relaying fuel injector diagnostic feedback to the PCM only via fuel injector control lines will be discussed in further detail below with reference to FIG. 5.

As described above, FIG. 1 shows only one cylinder of a multi-cylinder engine, and that each cylinder may similarly include its own set of intake/exhaust valves, fuel injector(s), spark plug, etc.

Figure 2:
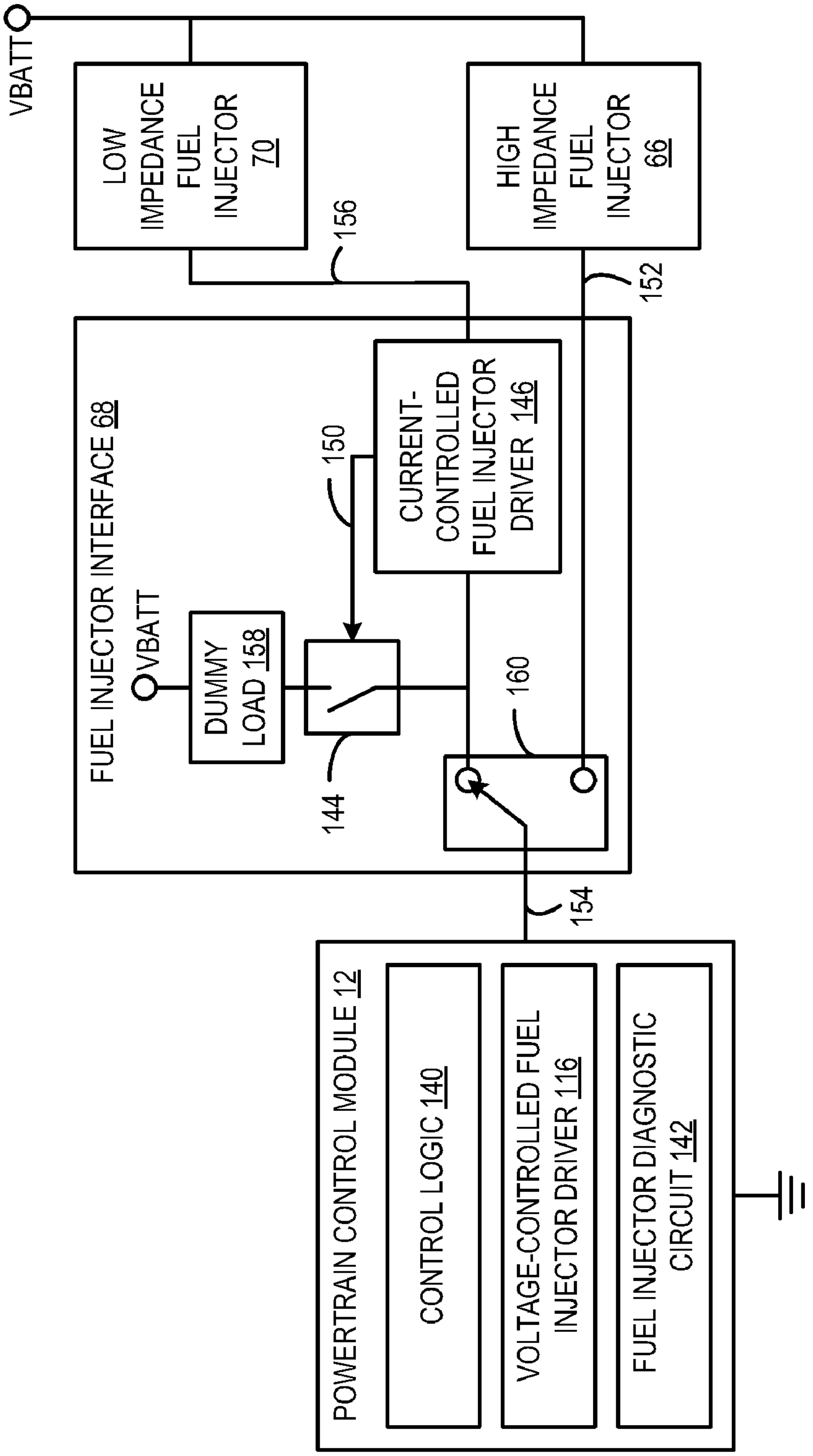
FIG. 2 is a schematic diagram of an embodiment of a fuel injection control system.

FIG. 2 is a schematic diagram showing an embodiment of a fuel injection control system that may be implemented, for example, in engine 10 of FIG. 1. The fuel injection control system includes a powertrain control module (PCM) 12 to generate fuel injection control signals that may be sent to fuel injector interface device 68 via control line 154. Fuel injector interface device 68 may relay the fuel injection control signals to high impedance fuel injector 66 and/or low impedance fuel injector 70 via control lines 156 and 152, respectively, based on a state of relay switch 160. In one example, the state of relay switch is controlled by control signals from PCM 12 generated based on engine operation conditions. More particularly, high impedance fuel injector 66 may receive output from voltage-controlled fuel injector driver circuit 116 that is relayed through fuel injector interface device 68 without being altered to a current-controlled signal. Further, fuel injector interface device 68 may alter a control signal received from PCM 12 from a voltage-controlled signal to a current controlled signal. The current-controlled signal may be relayed to low impedance fuel injector 70 via control line 156. In other words, fuel injector interface device 68 may relay the voltage-controlled control signal to high impedance fuel injector 66 as well as convert the signal output from voltage-controlled fuel injector driver circuit 116 to be compatible with low impedance fuel injector 70.

Note control lines 152, 154, and 156 may permit two-way communication. In some embodiments, the powertrain control module may include a separate control line for each fuel injector, and each control line may connect to a separate input of the fuel injector interface device.

PCM 12 may include control logic 140, a voltage-controlled fuel injector driver circuit 116, and a fuel injector diagnostic circuit 142. Control logic 140 may calculate signal FPW based on sensor inputs from various engine sensors of engine 10, as discussed above. For example, the control logic may include a microprocessor unit, an electronic storage medium for executable programs and calibration values in the form of read only memory, random access memory, and/or keep alive memory. Control logic 140 may input signal FPW to voltage-controlled fuel injector driver circuit 116.

Voltage-controlled fuel injector driver circuit 116 may include, for example, a transistor and a resistor which in turn is connected to control logic 140 of PCM 12. In one example, the resistor is connected between the base of the transistor and control logic 140 to limit current in case of external component (e.g., fuel injector or driver circuit transistor) degradation in order to inhibit degradation of control logic 140 and/or PCM 12. Note the above described voltage-controlled fuel injector driver circuit is merely an example and other circuit configurations may be implemented without departing from the scope of the present disclosure.

Fuel injector diagnostic circuit 142 may perform diagnostics on fuel injectors connected to PCM 12. More particularly, fuel injector diagnostic circuit 142 may detect a specific signal state (e.g., open, short-to-ground, short-to-power) that indicates fuel injector degradation of a particular fuel injector (e.g., high impedance or low impedance) from fuel injector control line 154. In other words, the PCM may detect an altered impedance or voltage of the control line. PCM 12 may determine which fuel injector has become degraded based on the state of relay 160. In either case, fuel injector interface device 68 may relay the degradation state of the fuel injectors to the PCM so that fuel injector diagnostics may be performed by the PCM.

Upon detection of the specific signal state that indicates fuel injector degradation, fuel injector degradation may be reported by PCM 12 and suitable actions may be carried out to compensate for degradation of the fuel injector. For example, an on-board diagnostic trouble code may be set to indicate fuel injector degradation. In particular, the powertrain control module may be configured to change an operating parameter in response to detecting fuel injector degradation based on the altered impedance or voltage of the control line. As an example, the cylinder may be deactivated, that is, no fuel or air may be provided to the cylinder. As another example, an amount of fuel injected by another fuel injector (e.g., high impedance fuel injector) may be adjusted to compensate for the degraded fuel injector. As another example, engine operation, and more particularly air-fuel control may be adjusted (e.g., less lean operation) so as to reduce knock since the low impedance fuel injector would not be able to inject alcohol, fuel blend, water, etc. directly into the cylinder to inhibit knock.

In some embodiments, the fuel injector diagnostic circuit may be integrated into voltage-controlled fuel injector driver circuit 116. In some embodiments, fuel injector diagnostics may be performed programmatically by control logic 140.

High impedance fuel injector 66 may include high resistance coils that draw a low amount of current. The low amperage drawn by high impedance fuel injector 66 may permit the high impedance fuel injector to dissipate heat through the high resistance coils and remain cool during operation. This may enable high impedance fuel injector 66 to receive a voltage-controlled signal output from voltage-controlled fuel injector driver circuit 116 via relay 160 without causing degradation of voltage-controlled fuel injector driver circuit 116. In other words, the voltage-controlled signal does not need to be converted to a current-controlled signal for high impedance fuel injector 66.

Figure 5:
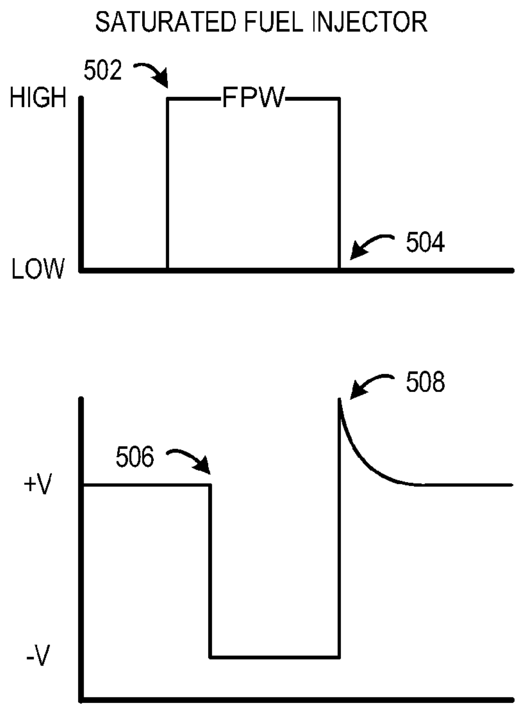
FIG. 5 is a graph depicting saturated operation of a fuel injector.

In some embodiments, voltage-controlled fuel injector driver circuit 116 may be what is referred to as a saturated fuel injector driver circuit. Operation of the saturated fuel injector driver circuit will herein be discussed in detail. FIG. 5 shows a graph depicting signal FPW and the corresponding voltage operation signature of the saturated fuel injector driver circuit. FIG. 5 will be referenced throughout the explanation to underscore voltage state changes that distinguish operation of the saturated fuel injector driver circuit.

As an example, during vehicle operation, control logic 140 may calculate signal FPW that results in a "high" signal being output to voltage-controlled fuel injector driver circuit 116, as shown at 502 of FIG. 5. When the "high" signal is present on the base of the transistor of voltage-controlled fuel injector driver circuit 116, the transistor becomes fully saturated. This causes a collector of the transistor to short to an emitter of the transistor, which drives the collector voltage to near 0 volts, as shown at 506 of FIG. 5. This drops the voltage (e.g., the full battery voltage) across the high impedance injector coil to open the fuel injector pintle to initiate fuel injection. The transistor remains saturated and the pintle remains open for the duration that signal FPW is in the "high" state. At the end of the pulse duration, the FPW goes to a "low" state, as shown at 504 of FIG. 5. This causes the collector of the transistor to open, as shown at 508 of FIG. 5. Correspondingly, this increases the voltage across the high impedance fuel injector causing the fuel injector pintle to shut. Accordingly, the transistor of voltage-controlled fuel injector driver circuit 116 turns fully on or achieves peak voltage for approximately the entire duration that signal FPW is in a "high" state and thus the signal output by the saturated fuel injector driver circuit may be referred to as a voltage-controlled signal.

As discussed above, the high impedance fuel injector in combination with the voltage-controlled fuel injector driver circuit may provide a simple, inexpensive, and widely available option for controlling fuel injection. However, the high impedance fuel injector may have an inherently slower dynamic response that decreases the usable flow range of the high impedance fuel injector. This may result in reduced fuel injection accuracy that may not be suitable for some applications (e.g., direct injection). Accordingly, the fuel injection control system may include a low impedance fuel injector 70.

Low impedance fuel injector 70 may include low resistance coils that draw a high amount of current, under some conditions. If the low impedance fuel injector was to be directly connected to voltage-controlled fuel injector driver circuit 116/PCM 12, then if the driver circuit was to become fully saturated, the full voltage of the battery would be delivered to the low resistance coils causing a large amount of current to be drawn by the low resistance coils that may lead to degradation of low impedance fuel injector 70, voltage-controlled fuel injector driver circuit 116, and/or PCM 12. In order to inhibit degradation of voltage-controlled fuel injector driver circuit 116 and/or PCM 12 low impedance fuel injector 70 may be connected to fuel injector interface device 68.

Fuel injector interface device 68 may include a current-controlled fuel injector driver circuit 146 to convert the voltage-controlled signal output from PCM 12 to be compatible with low impedance fuel injector 70. A switch 144 may be provided between control line 154 and dummy load 158. Switch 144 may provide selective connectivity between current-controlled fuel injector driver 146 and control line 154 based on the state of the switch. Under appropriate operating conditions, dummy load 158 may be connected to the PCM injector output to make fuel injector diagnostics circuit 142 think that it is indeed connected to a high impedance injector. Dummy load 158 permits the voltage-controlled signal output from voltage-controlled fuel injector driver circuit 116 to command current-controlled fuel injector driver 146.

Figure 6:
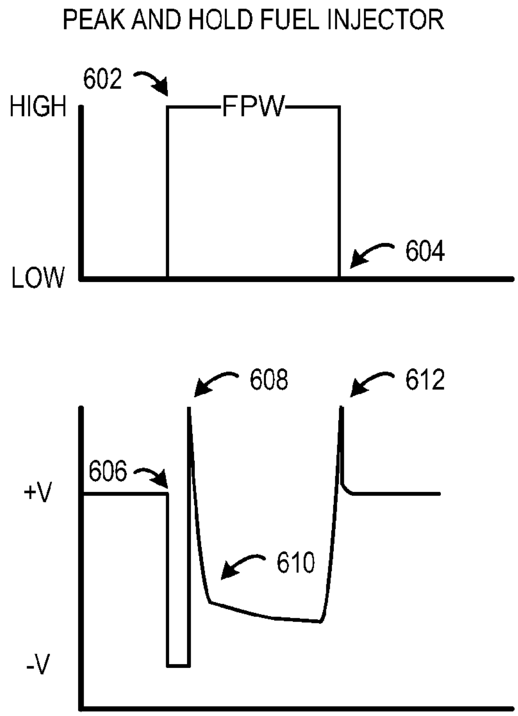
FIG. 6 is a graph depicting peak-and-hold operation of a fuel injector.

In some embodiments, current-controlled fuel injector driver circuit 146 may be what is referred to as a peak-and-hold driver circuit. Operation of the peak-and-hold fuel injector driver circuit will herein be discussed in detail. FIG. 6 shows a graph depicting signal FPW and the corresponding voltage operation signature of the peak-and-hold fuel injector driver circuit. FIG. 6 will be referenced throughout the explanation to underscore voltage state changes that distinguish operation of the peak-and-hold fuel injector driver circuit.

As an example, the peak-and-hold fuel injector driver circuit may include an analog circuit that relays the logic "high" of signal FPW (shown at 602 of FIG. 6) to the base of a transistor which fully saturates the transistor causing a collector of the transistor to short to an emitter of the transistor. The peak-and-hold fuel injector driver circuit may include a resistor connected in series with the emitter of the transistor. The series resistor allows for a voltage drop in the driver circuit, as shown at 606 of FIG. 6. The resulting voltage drop may be proportional to the increase in current through the low impedance fuel injector and may be monitored by the analog circuit.

When the analog circuit detects a predetermined voltage level, it is assumed that the peak current has been reached and the pintle of the low impedance fuel injector is fully opened. From this point on, a much smaller amount of current is needed to hold the pintle of the low impedance fuel injector open. The analog circuit backs the transistor base voltage off to a lower voltage to partially bias the transistor so that the collector voltage is increased, as shown at 608 of FIG. 6. As current is reduced, a voltage spike may occur from the inductive kickback of the low impedance fuel injector coil. The transistor bias holds the collector voltage at a higher level (as shown at 610 of FIG. 6) relative to the voltage level at peak current. The higher voltage level which is smaller compared to the battery voltage reduces the current through the low impedance fuel injector.

When the analog circuit backs the base voltage off, it goes into a loop mode continuously modifying the base voltage to hold the feedback voltage at the lower voltage, so the collector voltage remains at the higher level. In one example, a fast op-amp included in the analog circuit is used for feedback voltage control at the base of the transistor. When signal FPW reaches a "low" state at 604 of FIG. 6, the voltage is increased, as shown at 612 of FIG. 6, and the current at the low impedance fuel injector is dropped causing the pintle to shut.

The peak-and-hold driver circuit uses two levels of current to operate the low impedance fuel injector and thus the signal output by the peak-and-hold fuel injector driver circuit may be referred to as a current-controlled signal. The peak-and-hold driver circuit applies the battery voltage (or another voltage) to open the pintle of the low impedance fuel injector until a predetermined or peak current level is reached. The current is then reduced and held at a lower level or a hold current for the duration of the pulse width. At the end of the pulse width, the voltage is increased and the current is dropped to close the pintle of the low impedance fuel injector. The low hold current may inhibit degradation of the PCM and the low impedance fuel injector that may increase their work life. Moreover, the high peak current minimizes the opening time response of the low impedance fuel injector and the low hold current minimizes the closing time response of the low impedance fuel injector. Accordingly, the low impedance fuel injector may have an increased range of fuel injector operation within the fuel pulse width that allows for more accurate fuel injection operation.

Current-controlled fuel injector driver circuit 146 may be configured to detect certain types of degradation of low impedance fuel injector 70. More particularly, current-controlled fuel injector driver circuit 146 may be configured to diagnose degradation that appears on control line 156. For example, degradation may be diagnosed based on operation according to the current-controlled signal. More particularly, if the signal from low impedance fuel injector 70 does not follow the peak-and-hold operation signature of current-controlled fuel injector driver circuit 146, the low impedance fuel injector may be diagnosed to be degraded As another example, if the low impedance fuel injector is commanded to inject fuel and the fuel injector does not turn on, then the low impedance fuel injector may be diagnosed to be degraded. As another example, if the low impedance fuel injector is commanded to turn off and the fuel injector does not turn off, then the low impedance fuel injector may be diagnosed to be degraded.

Current-controlled fuel injector driver circuit 146 may send a diagnostic signal to a switch 144 via diagnostic line 150 in response to diagnosing degradation of low impedance fuel injector 70. The diagnostic signal may control the state of switch 144. By changing the state of switch 144 the dummy load may be disconnected from control line 154, thus causing the input voltage or impedance of fuel injector interface device 68 to be changed which may be detected by PCM 12 as fuel injector degradation. In other words, switch 144 may act as a diagnostic relay by passing diagnostic information for low impedance fuel injector 70 back to PCM 12 via control line 154 since the low impedance fuel injector and the PCM are not directly connected.

In some embodiments, switch 144 may include a transistor and the change of state received from diagnostic line 150 may trigger a change in state of the transistor. In some embodiments, the state of the transistor may be shorted-to-ground in response to receiving the degradation signal via diagnostic line 150. In some embodiments, the state of the transistor may be shorted-to-power in response to receiving the degradation signal via diagnostic line 150. In some embodiments, the state of the transistor may be opened to disconnect dummy load 150 in response to receiving the degradation signal via diagnostic line 150. If the change in state of switch 144 causes the transistor to open the voltage-controlled signal may still be received by the current-controlled fuel injector driver circuit in case degradation of the low impedance fuel injector clears. PCM 12 may monitor operation of high impedance fuel injector 66 and low impedance fuel injector 70. Degradation of high impedance fuel injector 66 may be detected by fuel injector diagnostic circuit 142 based on a signal received from high impedance fuel injector 66 via control line 152. Degradation of low impedance fuel injector 70 may be detected by fuel injector diagnostic circuit 142 based on a signal received from fuel injector interface device 68 via control line 154. More particularly, a degradation signal from current-controlled fuel injector driver circuit 146 may be relayed to the fuel injector diagnostic circuit via diagnostic line 150, switch 144, and control line 154. In some embodiments, PCM 12 may perform diagnostics on high impedance fuel injector 66 and/or low impedance fuel injector 70 programmatically based on signals receive via control lines 154 and 156. Upon receiving degradation signals for high impedance fuel injector 66 and/or low impedance fuel injector 70, PCM 12 may report that the fuel injector is degraded and adjust engine operation to compensate for the degraded fuel injector.

In previous fuel injection configurations, a current-controlled fuel injector driver circuit may provide no diagnostic information for a low impedance fuel injector to the PCM. Rather, a degradation signal received from the current-controlled fuel injector driver circuit at the PCM would indicate degradation of the driver circuit itself and not the low impedance fuel injector because the low impedance fuel injector and the PCM would not be directly connected. If a current-controlled fuel injector driver circuit or another intermediary device was capable of generating any diagnostic data for the low impedance fuel injector, the diagnostic data would have to be fed back to the PCM by an additional communication line such as a communication-area network (CAN) line. In other words, the previous fuel injection configurations provide no diagnostic feedback to the PCM or require extra PCM I/O pins, communication lines, and/or circuits to communicate low impedance fuel injector diagnostic data to the PCM.

However, in the present configuration, since fuel injector interface device 68 includes switch 144, the state of which is controlled based on a signal from current-controlled fuel injector driver circuit 146, dummy load 158 may be disconnected from control line 154 to change the voltage or impedance on control line 154. The change in voltage or impedance may be used to relay diagnostic data for the low impedance fuel injector to the PCM directly from the fuel injector interface device via control line 154 without use of a secondary communication line. In other words, degradation of low impedance fuel injector 70 may be only communicated to PCM 12 by control line 154 and not by any other communication line. For example, the diagnostic data may not be passed directly from current-controlled fuel injector driver circuit 146 to PCM 12 using a separate communication line such as a CAN line. In this way, any additional communication lines that would be used to pass diagnostic data back to the PCM may be eliminated, which may allow for I/O pins of the PCM that would be previously designated for fuel injector diagnostic data communication to be re-designated for other resources. Further, due to the diagnostic relay capabilities of the fuel injector interface device, the PCM may perform diagnostics on both high impedance and low impedance fuel injectors without being altered. In previous fuel injection control systems, a dummy load may be permanently connected which would necessitate the secondary communication line to pass along diagnostic data back to the PCM.

The above described fuel injector interface device may be connected between a PCM including a voltage-controlled fuel injector driver circuit and a low impedance fuel injector to provide suitable control signals and provide fuel injector diagnostic data through the same control/communication lines. In particular, the fuel injector interface device may include a current-controlled fuel injector driver circuit to convert the FPW signal received from the voltage-controlled fuel injector driver circuit of the PCM to be compatible with the low impedance fuel injector. In one example, the signal is converted from a saturated control signal to a peak-and-hold control signal. Furthermore, the current-controlled fuel injector driver circuit may control the state of a switch at the input of the fuel injector interface device. The state of the switch may be changed by the diagnostic circuit to disconnect a dummy load at the input of the fuel injector interface device to relay the degradation signal of the low impedance fuel injector to the PCM via the control line between the PCM and the fuel injector interface device. Accordingly, by implementing the fuel injector interface device, a PCM including a voltage-controlled fuel injector driver circuit may be used to control a low impedance fuel injector. Moreover, diagnostics of the low impedance fuel injector may be performed by the PCM using the fuel injector control lines without having to dedicate any additional communication lines for fuel injector diagnostic data.

Note one low impedance fuel injector and one high impedance fuel injector are shown. However, it will be appreciated that more than one low impedance fuel injector and/or more than one high impedance fuel injector may be implemented in a fuel injection control system. Further, each fuel injector may be connected via a separate control line and/or connection to the fuel injector interface device and/or separate control lines may be connected between the PCM and the fuel injector interface device.

Figure 3:
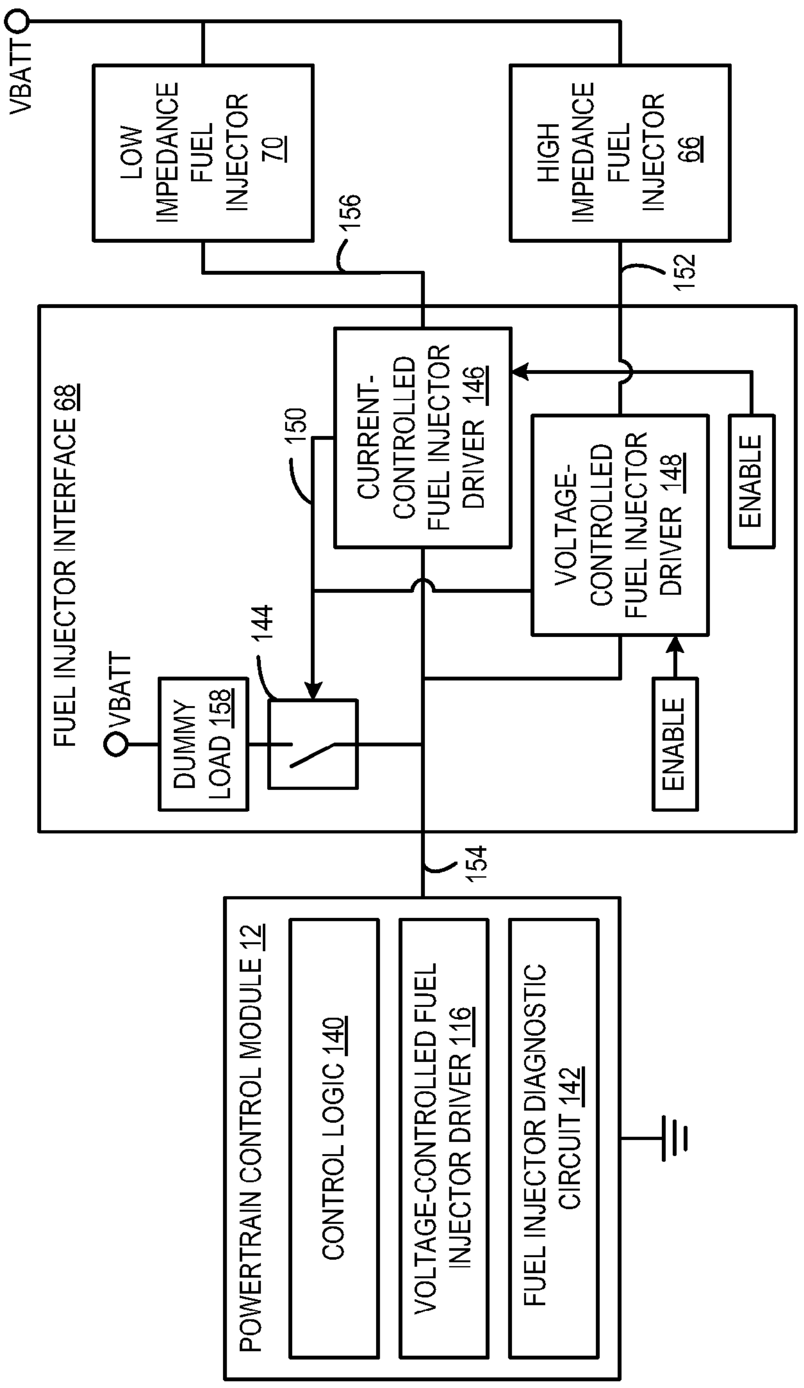
FIG. 3 is a schematic diagram of another embodiment of a fuel injection control system.

FIG. 3 is a schematic diagram showing another embodiment of a fuel injection control system that may be implemented, for example, in engine 10 of FIG. 1. The illustrated embodiment of the fuel injection control system may include components that may be substantially the same as those of the fuel injection control system of FIG. 2. These components are identified in the same way and are described no further. However, it will be noted that components identified in the same way in different embodiments of the present disclosure may be at least partly different.

In the illustrated embodiment, fuel injector interface device 68 may include voltage-controlled fuel injector driver circuit 148. Voltage-controlled fuel injector driver circuit 148 may operate in substantially the same manner as voltage-controlled fuel injector driver circuit 116. In other words, fuel injector interface device 68 replicates the voltage-controlled fuel injector driver so that each type of fuel injector may be operated by a separate driver circuit. The redundant voltage-controlled driver circuit may be used in place of a relay switch so as to avoid high power switching as would be the case with the relay switch. Accordingly, current-controlled fuel injector driver circuit 146 may provide a current-controlled signal to low impedance fuel injector 70 and voltage-controlled fuel injector driver circuit 148 may provide a voltage-controlled signal to high impedance fuel injector 66.

Current-controlled fuel injector driver circuit 146 and voltage-controlled fuel injector driver circuit 148 each may be enabled separately based on control signals received from control line 154. Although each driver circuit may be controlled by the same type of signal (e.g., a voltage-controlled signal) different signal instances may be used to drive the different driver circuits. Such signal instances may include an indicator that causes a particular driver circuit to be enabled.

Figure 4:
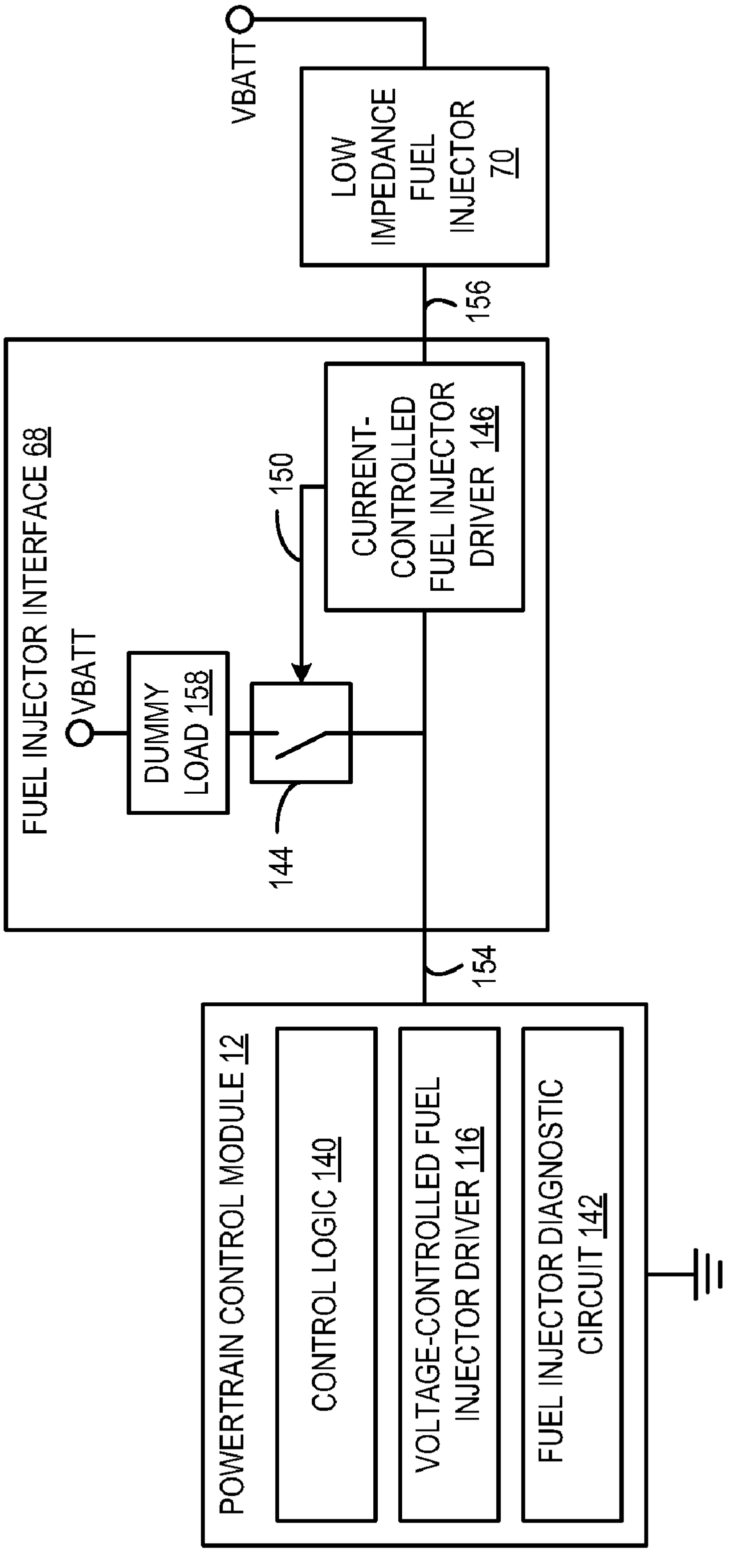
FIG. 4 is a schematic diagram of another embodiment of a fuel injection control system.

Furthermore, current-controlled fuel injector driver circuit 146 and voltage-controlled fuel injector driver circuit 148 each may be connected to diagnostic line 150. When either of the driver circuits is enabled, they may control the state of switch 144 based on fuel injector diagnostic data. In one example, a selector switch may be placed on the diagnostic line that is controlled by the enable of each circuit driver such that only the injector driver being used would cause the state of the switch to be changed. This would allow degradation information to be relayed to the PCM for only the fuel injector that is enabled or in use. In either case, fuel injector diagnostic circuit 142 may receive diagnostic data about the low impedance fuel injector or the high impedance fuel injector via control line 154. In particular, the driver circuit that is enabled may change the state of switch 144 via diagnostic line 150 in response to diagnosing fuel injector degradation. The change in state of switch 144 may disconnected dummy load 158 from the input of fuel injector interface 68 to cause a change in voltage or impedance on control line 154 which may be detected by fuel injector diagnostic circuit 142. FIG. 4 is a schematic diagram showing another embodiment of a fuel injection control system that may be implemented, for example, in engine 10 of FIG. 1.

In the illustrated embodiment, a high impedance fuel injector is omitted. This configuration may be implemented, for example, in a direct injection application and the low impedance fuel injector may be used for direct fuel injection. Since only one type of fuel injector is used, a relay switch and/or a replicated voltage-controlled fuel injector driver circuit may be omitted from the fuel injector interface device. In the illustrated embodiment, the PCM injector output control line 154 has to be connected to dummy load 158 to make fuel injector diagnostic circuit 142 think that it is indeed connected to a high impedance injector so that the diagnostic circuit can interface with a low impedance fuel injector without alteration. The output of voltage-controlled fuel injector driver circuit 116 becomes the command for current-controlled fuel injector driver circuit 146 in fuel injector interface device 68. Current-controlled fuel injector driver circuit 146 may detect degradation of low impedance fuel injector by monitoring signals on output control line 156. Any degradation it detects causes a signal to be sent on diagnostic line 150. Diagnostic line 150 commands dummy load 158 to be disconnected by changing a state of switch 144, thus causing PCM 12 to detect the fuel injector degradation.

In some embodiments, the switch may be commanded to a short-to-ground or short-to-power state instead of an open state. However with these states, if the injector degradation should ever clear, the PCM command is now disabled. By disconnecting the dummy load, the injector signal is allowed to continue to make it to the current-controlled fuel injector driver circuit. In some embodiments, a PCM may include a current-controlled driver circuit and high impedance fuel injector may be used for fuel injection. In this case, the fuel injector interface device may include a voltage-controlled driver circuit that is driven by the output of the current-controlled driver circuit of the PCM. Further, the voltage-controlled fuel injector driver circuit may detect degradation of the high impedance fuel injector and control a switch connected between a dummy load and the control line of the PCM as described above. Accordingly, degradation of the high impedance fuel injector may be relayed to the PCM based on change in voltage or impedance on the control line caused by the disconnection of the dummy load. In this way, a PCM including a current-controlled fuel injector driver circuit may control and perform diagnostic on a high impedance fuel injector via the same control line without any need for additional lines to relay fuel injector degradation data back to the PCM. In such embodiments, low impedance fuel injectors and high impedance fuel injectors may be connected to the fuel injector interface device as described above.

The configurations illustrated above enable various methods for controlling fuel injection and performing diagnostics on a low impedance fuel injector using a PCM including a voltage-controlled fuel injector driver circuit. Accordingly, some such methods are now described, by way of example, with continued reference to above configurations. It will be understood, however, that these methods, and others fully within the scope of the present disclosure, may be enabled via other configurations as well.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

Figure 7:
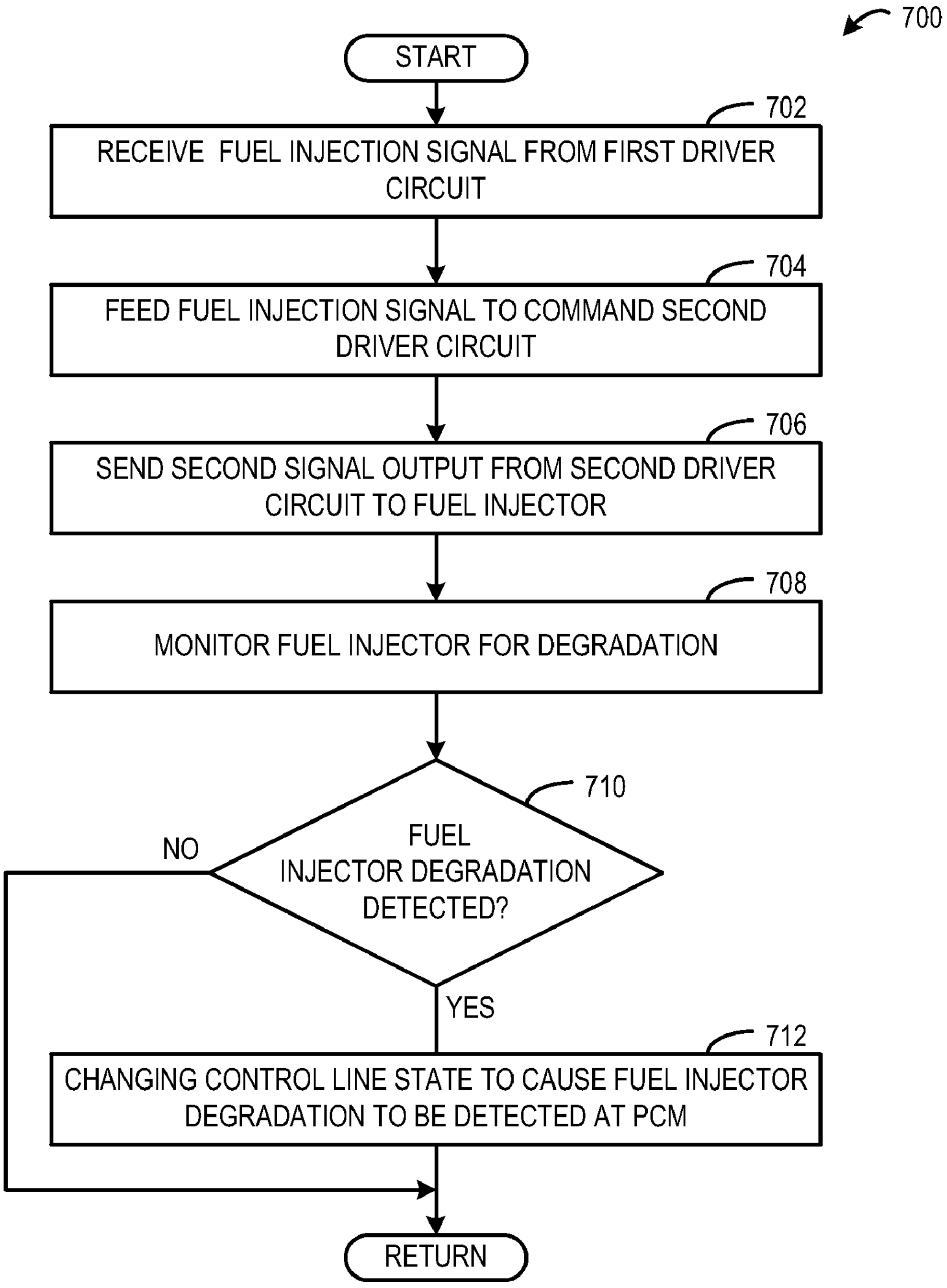
FIG. 7 is a flow diagram of a method for controlling fuel injection and performing diagnostics on a low impedance fuel injector.

FIG. 7 is a flow diagram of a method 700 for controlling fuel injection and performing diagnostics on a low impedance fuel injector based on control signals received from a voltage-controlled fuel injector driver circuit of a PCM. As an example, the method may be performed by fuel injector interface device 68 of FIGS. 2-4.

At 702, the method may include receiving a fuel injection signal from a first fuel injector driver circuit. As one example, the fuel injection signal is a voltage-controlled signal provided from a voltage-controlled fuel injector driver circuit of a PCM via a control line. In some embodiments, voltage-controlled fuel injector driver circuit may be a saturated fuel injector driver circuit. As another example, the fuel injection signal is a current-controlled signal provided from a current-controlled fuel injector driver circuit of a PCM. In some embodiments, current-controlled fuel injector driver circuit may be a peak-and-hold fuel injector driver circuit. In one particular example, the voltage-controlled signal may be received at fuel injector interface device 68 from PCM 12 via control line 154.

At 704, the method may include feeding the fuel injection signal to a command stage of a second driver circuit. As an example, the fuel injection signal may be a voltage-controlled signal that is fed to or drives a current-controlled fuel injector driver circuit. In this example, the voltage-controlled signal is converted to a current-controlled signal. As another example, the fuel injection signal may be a current-controlled signal that is fed to or drives a voltage-controlled fuel injector driver circuit. In this example, the current-controlled signal is converted to a voltage-controlled signal. In one particular example, the second driver circuit may be driver circuit 146 or driver circuit 148 of fuel injector interface device 68. At 706, the method may include sending a fuel injection signal output from the second driver circuit to a fuel injector. As an example, the fuel injection signal may be a current-controlled signal output from a current-controlled fuel injector driver circuit that is sent to a low impedance fuel injector. As another example, the fuel injection signal may be a voltage-controlled signal output from a voltage-controlled fuel injector driver circuit that is sent to a high impedance fuel injector. In one particular example, the fuel injection signal may be produced by injector driver circuit 146 of fuel injector interface device 68 and sent to low impedance fuel injector 70. In another example, the fuel injection signal may be produced by driver circuit 148 of interface device 68 and sent to high impedance fuel injector 66. At 708, the method may include monitoring the fuel injector for degradation. Monitoring may be performed by looking at the feedback of the fuel injector to determine if the fuel injector behaves as commanded by the signal output from the second driver circuit. In one example, as shown in FIG. 2, current-controlled driver circuit 146 may be connected to control line 156 at the output of fuel injector interface device 68 and may monitor feedback from low impedance fuel injector 70 to determine if the low impedance fuel injector is degraded.

At 510, the method may include determining if the low impedance fuel injector is degraded. As an example, if the low impedance fuel injector does not turn on or off as commanded by the current-controlled signal the low impedance fuel injector may be determined to be degraded. As another example, if the current of the low impedance fuel injector remains at a peak current and does not back down to a hold current during fuel injection, the low impedance fuel injector may be determined to be degraded. In one example, the degradation determination may be made by current-controlled driver circuit 146 of fuel injector interface device 68 based on feedback on control line 156 from low impedance fuel injector 70. If it is determined that the fuel injector is degraded the method moves to 512. Otherwise, it is determined that the fuel injector is not degraded and the method ends or returns to other operations.

At 512, the method may include changing a state of the control line to relay the fuel injector degradation signal to the PCM. Changing the state of the control line may include disconnecting a dummy injector load, to change a voltage or impedance on the control line which can be detected via the PCM's fuel injector driver circuit. In one example, switch 144 is provided at the input of fuel injector interface device 68 between dummy load 158 between control line 154 connected to PCM 12. Further, switch 144 is connected to current-controlled fuel injector driver circuit 146. The state of switch 144 is controlled by current-controlled driver circuit 146 via diagnostic line 150. As such, when current-controlled driver circuit 146 diagnosis degradation of low impedance fuel injector 70, the driver circuit may send a degradation signal via diagnostic line 150 to switch 144 to adjust the state of switch 144. In some embodiments, the state of switch 144 may be adjusted to a shorted-to-ground state. In some embodiments, the state of switch 144 may be adjusted to a shorted-to-power state. In some embodiments, the state of switch 144 may be adjusted to an open state. By adjusting to an open state, the dummy load may be disconnected from the control line while still allowing the voltage-controlled signal to be sent to the current-controlled fuel injector driver circuit. As such, if the fuel injector degradation were to clear, fuel injection operation may resume. In some embodiments, degradation of low impedance fuel injector 70 may be only communicated to PCM 12 by control line 154 and not by any other communication line.

The above method may be performed by a fuel injector interface device to accurately control a fuel injector that is compatible with a signal different than one provided by a PCM. Moreover, the method may enable diagnostic data for the fuel injector to be relayed back to the PCM through the same line used to control the fuel injector. In this way, the low impedance fuel injector degradation data may be communicated to the PCM without use of additional I/O pins and/or communication lines even though the fuel injector is not directly connected to the PCM. The method may be used to perform accurate control and diagnostics on a low impedance fuel injector using a PCM that includes a voltage-controlled fuel injector driver circuit. Accordingly, a less expensive PCM may be used to provide a reduction in engine production costs while still providing enhanced fuel injector functionality. Further, the method may be used to performed accurate control and diagnostics on a high impedance fuel injector using a PCM that includes a current-controlled fuel injector driver circuit.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

The invention claimed is:

1. A method comprising:

receiving a fuel injection signal from a saturated driver circuit via a control line;

feeding the fuel injection signal to a peak-and-hold fuel injector driver circuit;

sending a control signal from the peak-and-hold driver circuit to a fuel injector; and responsive to fuel injector degradation based on fuel injector operation according to the control signal, changing a state of the control line, the fuel injector degradation communicated only by the control line.

2. The method of claim 1, and the fuel injector is a low impedance fuel injector having a resistance selected from a range between approximately 1 and 5 Ohms.

3. The method of claim 1, wherein the degradation is communicated by the control line to a powertrain control module, where the fuel injector is not directly connected to the powertrain control module.

4. The method of claim 1, wherein the control line is connected to a powertrain control module and the degradation is not communicated to the powertrain control module by any other communication line.

5. The method of claim 1, wherein changing the state of the control line includes disconnecting a dummy load that changes a voltage or impedance on the control line.

6. The method of claim 1, wherein changing the state of the control line includes changing a state of a transistor connected to the control line.

7. The method of claim 6, wherein changing the state of the transistor includes changing the transistor to an open state, a short-to-ground state, or short-to-power state.

8. A system comprising:

a low impedance fuel injector;

a powertrain control module to provide a voltage-controlled fuel injection signal;

a fuel injector interface device to receive the voltage-controlled fuel injection signal from the powertrain control module via a first control line, the fuel injector interface device including:

a current-controlled fuel injector driver circuit to convert the voltage-controlled fuel injection signal to a current-controlled fuel injection signal, the current-controlled fuel injection signal being sent to the low impedance fuel injector via a second control line, and a switch provided between the first control line and the current-controlled fuel injector driver circuit, the current-controlled fuel injector driver circuit being configured to diagnose degradation of the low impedance fuel injector, the current-controlled fuel injector driver circuit including a diagnostic line that controls a state of the switch, and in response to diagnosing degradation of the low impedance fuel injector, the current-controlled fuel injector driver circuit being configured to change a state of the switch via the diagnostic line to alter an impedance or voltage of the first control line; and the powertrain control module being configured to change an operating parameter in response to detecting that the impedance or voltage of the first control line has been altered.

9. The system of claim 8, further comprising:

a high impedance fuel injector to receive a second voltage-controlled fuel injection signal from the fuel injector interface device via a third control line, the second voltage-controlled fuel injection signal being provided from the powertrain control module to the fuel injector interface device via the first control line, the high impedance fuel injector having a resistance selected from a range between approximately 10 and 16 Ohms and the low impedance fuel injector having a resistance selected from a range between approximately 1 and 5 Ohms, and the voltage-controlled fuel injection signal being a saturated signal and the current-controlled fuel injection signal being a peak-and-hold signal.

10. The system of claim 9, wherein the fuel injector interface device further includes a voltage-controlled fuel injector driver circuit connected to the third control line, the voltage-controlled fuel injector driver circuit being configured to diagnose degradation of the high impedance fuel injector, the current-controlled fuel injector driver circuit including a second diagnostic line that controls a state of the switch, and in response to diagnosing degradation of the high impedance fuel injector, the current-controlled fuel injector driver circuit being configured to change a state of the switch via the second diagnostic line to alter an impedance or voltage of the first control line.

11. The system of claim 9, wherein the fuel injector interface device includes a relay switch, connected to the first control line, to switch to the current-controlled fuel injector driver circuit based on the first voltage-controlled fuel injection signal and switch to the third control line based on the second voltage-controlled fuel injection signal.

12. The system of claim 9, wherein the high impedance fuel injector is a port fuel injector and the low impedance fuel injector is a direct fuel injector.

13. The system of claim 8, wherein the voltage-controlled fuel injection signal is a saturated signal and the current-controlled fuel injection signal is a peak-and-hold signal.

14. The system of claim 8, wherein degradation of the low impedance fuel injector is only communicated to the powertrain control module by the first control line and not by any other communication line.

15. A method comprising:

receiving a fuel injection signal from a peak-and-hold driver circuit via a control line;

feeding the fuel injection signal to a saturating fuel injector driver circuit;

sending a control signal from the saturating fuel injector driver circuit to a fuel injector; and responsive to fuel injector degradation based on fuel injector operation according to the control signal, changing a state of the control line, the fuel injector degradation communicated only by the control line.

16. The method of claim 15, wherein the fuel injector is a high impedance fuel injector having a resistance selected from a range between approximately 10 and 16 Ohms.

17. The method of claim 15, wherein the degradation is communicated by the control line to a powertrain control module, where the fuel injector is not directly connected to the powertrain control module.

18. The method of claim 15, wherein the control line is connected to a powertrain control module and the degradation is not communicated to the powertrain control module by any other communication line.

19. The method of claim 15, wherein changing the state of the control line includes disconnecting a dummy load that changes a voltage or impedance on the control line.

20. The method of claim 15, wherein changing the state of the control line includes changing a state of a transistor connected to the control line.

21. The method of claim 20, wherein changing the state of the transistor includes changing the transistor to an open state, a short-to-ground state, or short-to-power state.

* * * * *